(12) United States Patent
Gosling

(10) Patent No.: US 8,193,399 B2
(45) Date of Patent: *Jun. 5, 2012

(54) PRODUCTION OF DIESEL FUEL AND AVIATION FUEL FROM RENEWABLE FEEDSTOCKS

(75) Inventor: Christopher D. Gosling, Roselle, IL (US)

(73) Assignee: UOP LLC, Des Plaines, IL (US)

( * ) Notice: Subject to any disclaimer, the term of this patent is extended or adjusted under 35 U.S.C. 154(b) by 585 days.

This patent is subject to a terminal disclaimer.

(21) Appl. No.: 12/401,743

(22) Filed: Mar. 11, 2009

(65) Prior Publication Data

US 2009/0229173 A1 Sep. 17, 2009

Related U.S. Application Data

(60) Provisional application No. 61/037,073, filed on Mar. 17, 2008.

(51) Int. Cl.
 C10L 1/16 (2006.01)
 C07C 4/00 (2006.01)

(52) U.S. Cl. ............ 585/14; 44/601; 44/605; 585/240; 585/242

(58) Field of Classification Search ............. 585/240, 585/242, 14; 44/601, 605
See application file for complete search history.

(56) References Cited

U.S. PATENT DOCUMENTS

| | | | |
|---|---|---|---|
| 4,992,605 A * | 2/1991 | Craig et al. ............... | 585/240 |
| 5,186,722 A | 2/1993 | Cantrell et al. | |
| 5,705,722 A | 1/1998 | Monnier et al. | |
| 7,232,935 B2 * | 6/2007 | Jakkula et al. ............ | 585/240 |
| 7,279,018 B2 | 10/2007 | Jakkula et al. | |
| 7,288,685 B2 * | 10/2007 | Marker .................... | 585/240 |
| 7,425,657 B1 | 9/2008 | Elliott et al. | |
| 7,459,597 B2 | 12/2008 | Koivusalmi et al. | |
| 7,491,858 B2 | 2/2009 | Murzin et al. | |
| 7,501,546 B2 | 3/2009 | Koivusalmi et al. | |
| 7,540,952 B2 | 6/2009 | Pinho et al. | |
| 7,550,634 B2 * | 6/2009 | Yao et al. .................. | 585/240 |
| 7,691,159 B2 * | 4/2010 | Li ........................... | 44/605 |
| 7,718,051 B2 * | 5/2010 | Ginosar et al. ............ | 208/113 |
| 7,816,570 B2 * | 10/2010 | Roberts et al. ............ | 585/240 |
| 7,928,273 B2 * | 4/2011 | Bradin ..................... | 585/14 |
| 7,968,757 B2 * | 6/2011 | Abhari et al. ............. | 585/240 |
| 2006/0186020 A1 | 8/2006 | Gomes | |
| 2006/0207166 A1 | 9/2006 | Herskowitz et al. | |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 * | 6/2007 | Koivusalmi et al. ...... | 208/19 |
| 2007/0135316 A1 | 6/2007 | Koivusalmi et al. | |
| 2007/0135663 A1 | 6/2007 | Aalto et al. | |

(Continued)

FOREIGN PATENT DOCUMENTS

CN 11270300 A 9/2008

(Continued)

*Primary Examiner* — Nina Bhat
(74) *Attorney, Agent, or Firm* — Maryann Maas

(57) ABSTRACT

A process has been developed for producing diesel fuel from renewable feedstocks such as plant oils and greases. The process involves treating a renewable feedstock by hydrogenating and deoxygenating to provide a diesel fuel hydrocarbon product. If desired, the hydrocarbon product can be isomerized to improve cold flow properties. A portion of the hydrocarbon product is recycled to the treatment zone to increase the hydrogen solubility of the reaction mixture.

17 Claims, 1 Drawing Sheet

U.S. PATENT DOCUMENTS

| | | |
|---|---|---|
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1* | 11/2007 | Santiago et al. ............. 585/733 |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077866 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |

FOREIGN PATENT DOCUMENTS

| | | |
|---|---|---|
| CN | 11343552 A | 1/2009 |
| EP | 1719811 A1 | 8/2006 |
| EP | 2046917 A0 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

* cited by examiner

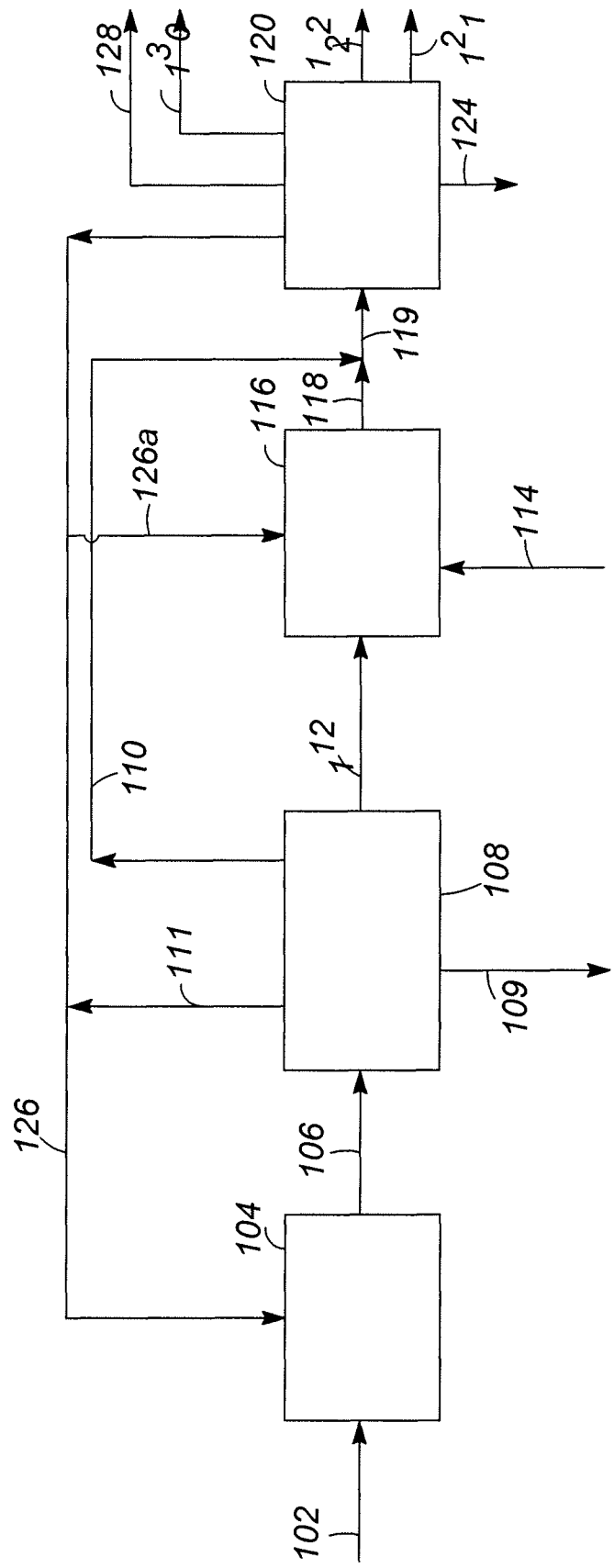

PRODUCTION OF DIESEL FUEL AND AVIATION FUEL FROM RENEWABLE FEEDSTOCKS

CROSS-REFERENCE TO RELATED APPLICATION

This application claims priority from Provisional Application Ser. No. 61/037,073 filed Mar. 17, 2008, the contents of which are hereby incorporated by reference in its entirety.

BACKGROUND OF THE INVENTION

This invention relates to a process for producing hydrocarbons useful as diesel fuel and aviation fuel from renewable feedstocks such as the glycerides and free fatty acids found in materials such as plant and animal oils. The process involves hydrogenation, deoxygenation, hydroisomerization, and selective hydrocracking in one or more reactors to generate both a diesel fuel product and an aviation fuel product.

As the demand for diesel fuel and aviation fuel increases worldwide there is increasing interest in sources other than petroleum crude oil for producing the fuels. One such source is what has been termed renewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these compounds contain aliphatic carbon chains having from about 8 to about 24 carbon atoms. The aliphatic carbon chains in the glycerides or FFAs can be saturated or mono-, di- or poly-unsaturated. The glycerides may be tri-glycerides, di-glycerides, mono-glycerides, or any combination thereof.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises an optional pretreatment step, and one or more steps to hydrogenate, deoxygenate, hydroisomerize and selective hydrocrack a renewable feedstock, in order to generate both a diesel fuel product and an aviation fuel product.

SUMMARY OF THE INVENTION

The process is for producing both a diesel range product and an aviation range product from a renewable feedstock. The process begins with hydrogenating and deoxygenating the renewable feedstock by contacting the renewable feedstock and hydrogen with a hydrogenation and deoxygenation catalyst in a hydrogenation and deoxygenation zone at hydrogenating and deoxygenating conditions to provide a hydrogenation and deoxygenation zone effluent comprising paraffins, hydrogen, water, and carbon oxides. The hydrogenation and deoxygenation zone effluent is separated to for at least a paraffin stream. The paraffin stream is isomerized and selectively hydrocracked by contacting the separated paraffins, in the presence of hydrogen, with an isomerization and selective hydrocracking catalyst in an isomerization and selective hydrocracking zone at isomerization and selective hydrocracking conditions to generate an isomerization and selective cracking zone effluent comprising at least normal and branched paraffins in the diesel boiling point range, normal and branched paraffins in the aviation boiling point range, hydrogen, naphtha, and LPG. The isomerization and selective hydrocracking zone effluent is separated into a gaseous component and a liquid component wherein the liquid component comprises the normal and branched paraffins in the diesel boiling point range, normal and branched paraffins in the aviation boiling point range, naphtha, and LPG. The liquid component is separated, in a fractionation zone, into at least a diesel boiling range product and an aviation boiling range product.

BRIEF DESCRIPTION OF THE DRAWING

The FIGURE is a general flow scheme of one embodiment of the invention. Some optional streams are shown.

DETAILED DESCRIPTION OF THE INVENTION

As stated, the present invention relates to a process for producing two fuels, a diesel fuel and an aviation fuel, from renewable feedstocks such as those originating from plants or animals. The term renewable feedstock is meant to include feedstocks other than those obtained from petroleum crude oil. The renewable feedstocks that can be used in the present invention include any of those which comprise glycerides and free fatty acids (FFA). Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, inedible tallow, yellow and brown greases, lard, train oil, fats in milk, fish oil, algal oil, sewage sludge, crambe oil, and the like. The glycerides and FFAs of the typical vegetable or animal fat contain aliphatic hydrocarbon chains in their structure which have about 8 to about 24 carbon atoms. Other classes of compounds include free fatty methyl esters, and free fatty ethyl esters. Most of the glycerides will be tri-glycerides, but mono-glycerides and di-glycerides may be present and processed as well. Mixtures or co-feeds of renewable feedstocks and petroleum derived hydrocarbons may also be used as the feedstock. Other feedstock components which may be used, especially as a co-feed component in combination with the above listed feedstocks include spent motor oils and industrial lubricants, used paraffin waxes, liquids derived from the gasification of coal, biomass, natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a petroleum based or other process into a valuable co-feed component to the current process.

Renewable feedstocks including renewable feedstocks that can be used in the present invention may contain a variety of impurities. For example, tall oil is a by product of the wood processing industry and tall oil contains esters and rosin acids in addition to FFAs. Rosin acids are cyclic carboxylic acids. The bio-renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow.

Another possible means for removing contaminants is a mild acid wash. This is carried out by contacting the feedstock with an acid such as sulfuric, nitric, phosphoric, or hydrochloric in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. Ser. No. 11/770,826 is another pretreatment technique which may be employed.

The feedstock is flowed to a hydrogenation and deoxygenation zone comprising one or more catalyst beds in one or more reactors. The term feedstock is meant to include feedstocks that have not been treated to remove contaminants as well as those feedstocks purified in a pretreatment zone. In the this reaction zone, the feedstock is contacted with a hydrogenation or hydrotreating catalyst in the presence of hydrogen at hydrogenation conditions to hydrogenate the olefinic or unsaturated portions of the n-paraffinic chains. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation and hydrotreating catalysts enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. Decarboxylation and decarbonylation conditions include a relatively low pressure of about 3447 kPa (500 psia) to about 6895 kPa (1000 psia), a temperature of about 288° C. to about 345° C. and a liquid hourly space velocity of about 1 to about 4 $hr^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all three reactions occur simultaneously in one reactor or in one bed. Alternatively, the conditions can be controlled such that hydrogenation primarily occurs in one bed and decarboxylation and/or hydrodeoxygenation occurs in a second bed. If only one bed is used, then hydrogenation may occur primarily at the front of the bed, while decarboxylation, decarbonylation and hydrodeoxygenation may occur mainly in the middle and bottom of the bed. Finally, desired hydrogenation can be carried out in one reactor, while decarboxylation, decarbonylation, and/or hydrodeoxygenation can be carried out in a separate reactor.

Hydrogen is a reactant in the reactions above, and to be effective, a sufficient quantity of hydrogen must be in solution to most effectively take part in the catalytic reaction. Past processes have operated at high pressures in order to achieve a desired amount of hydrogen in solution and readily available for reaction. If hydrogen is not available at the reaction site of the catalyst, the coke forms on the catalyst and deactivates the catalyst. To solve this problem, the pressure is often raised to insure enough hydrogen is available to avoid coking reactions on the catalyst. However, higher pressure operations are more costly to build and to operate as compared to their lower pressure counterparts. In general, the hydrogenation and deoxygenation conditions include a temperature of about 200° C. to about 400° C. and a pressure of about 1379 kPa absolute (200 psia) to about 13,790 kPa absolute (2000 psia).

One advantage of the present invention is the opportunity for the operating pressure of the hydrogenation and deoxygenation zone to be in the range of about 1379 kPa absolute (200 psia) to about 4826 kPa absolute (700 psia) which is lower than that found in other previous operations. In another embodiment the operating pressure may be in the range of about 2413 kPa absolute (350 psia) to about 4481 kPa absolute (650 psia), and in yet another embodiment operating pressure may be in the range of about 2758 kPa absolute (400 psia) to about 4137 kPa absolute (600 psia). Furthermore, the rate of reaction may be increased resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

In one embodiment, the desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is set based on the need to control the level of hydrogen in the liquid phase and therefore reduce the deactivation rate. The amount of optional recycle is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. In one embodiment of the invention, the volume ratio of hydrocarbon recycle to feedstock is from about 2:1 to about 8:1. In another embodiment the ratio is in the range of about 3:1 to about 6:1 and in yet another embodiment the ratio is in the range of about 4:1 to about 5:1. The specific ranges of vol/vol ratios of recycle to feed is determined based on achieving a suitable hydrogen solubility in the deoxygenation reaction zone.

The reaction product from the deoxygenation reactions in the hydrogenation and deoxygenation zone will comprise a liquid portion and a gaseous portion. The gaseous portion comprises hydrogen, carbon dioxide, carbon monoxide, water vapor, propane and perhaps sulfur components such as hydrogen sulfide or phosphorous component such as phosphine. The separated gaseous portion comprises mostly hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in co-pending application Ser. Nos. 12/193,176 and 12/193,196 both filed on Aug. 18, 2008 and hereby incorporated by reference may be employed. If desired, essentially pure carbon dioxide can be recovered by regenerating the spent absorption media. The hydrogen remaining after the removal of the carbon dioxide may be recycled to either of the reaction zones. Water may also be removed from the hydrogenation and deoxygenation zone effluent.

The liquid portion, after water is removed, comprises a hydrocarbon fraction which is essentially all n-paraffins. Different feedstocks will result in different distributions of paraffins. A portion of this hydrocarbon fraction, after separation, may be used as the hydrocarbon recycle described above. Although this hydrocarbon fraction may be useful as a diesel fuel or possibly an aviation fuel, because it comprises essentially all n-paraffins, it will have poor cold flow and freeze point properties. Also, depending upon the feedstock, the amount of hydrocarbons suitable for aviation fuel may be small. Therefore, the liquid portion of the reaction product is contacted with an isomerization catalyst under isomerization conditions to at least partially isomerize the n-paraffins to branched-paraffins. The isomerization catalysts and operating conditions are selected so that the isomerization catalyst also catalyzes selective hydrocracking of the paraffins. The selective hydrocracking creates additional hydrocarbons in the aviation range. The effluent of the second reaction zone, the isomerization and selective hydrocracking zone, is a branched-paraffin-enriched stream. By the term "enriched" it is meant that the effluent stream has a greater concentration of branched paraffins than the stream entering the isomerization zone, and preferably comprises greater than 50 mass-% branched paraffins. It is envisioned that the isomerization zone effluent may contains 70, 80, or 90 mass-% branched paraffins. Isomerization and selective hydrocracking can be carried out in a separate bed of the same reactor, described above or the isomerization and selective hydrocracking can be carried out in a separate reactor. For ease of description, the following will address the embodiment where a second reactor is employed for the isomerization and selective hydrocracking reactions.

The liquid portion of the deoxygenation reaction zone effluent is contacted with an isomerization and selective hydrocracking catalyst in the presence of hydrogen at isomerization and selective hydrocracking conditions to isomerize at least a portion of the normal paraffins to branched paraffins. Due to the presence of hydrogen, the reactions may be called hydroisomerization and hydrocracking.

The isomerization and selective hydrocracking of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230

At least the liquid portion of the product of the hydrogenation and deoxygenation reaction zone is contacted with an isomerization catalyst in the presence of hydrogen at isomerization conditions to isomerize the normal paraffins to branched paraffins and to selectively hydrocrack at least a portion of the paraffins. Due to the presence of hydrogen, the reactions may be called hydroisomerization and hydrocracking. The isomerization of the paraffinic product can be accomplished in any manner known in the art or by using any suitable catalyst known in the art. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include aluminas, amorphous alumina, amorphous silica-aluminas, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization and selective hydrocracking catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al- BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization and selective hydrocracking catalyst may be any of those well known in the art such as those described and cited above. Isomerization and selective cracking conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art.

The effluent of the isomerization and selective hydrocracking zone, is now processed through one or more separation steps to obtain a purified hydrocarbon stream useful as a diesel fuel or a diesel fuel blending component and a purified hydrocarbon stream useful as an aviation fuel or aviation fuel blending component. Because the effluent comprises both a liquid and a gaseous component, the liquid and gaseous components are separated using a separator such as a cold separator. The separated liquid component contains the hydrocarbons useful as diesel fuel and those useful as an aviation fuel, termed diesel fuel range hydrocarbons and aviation fuel range hydrocarbons, respectively, as well as smaller amounts of naphtha and LPG. The separated liquid component is further purified in a product distillation zone which separates lower boiling components and dissolved gases into an LPG and naphtha stream; an aviation range product; and a diesel range product. Suitable operating conditions of the product distillation zone include a temperature of from about 20 to about 200° C. at the overhead and a pressure from about 0 to about 1379 kPa absolute (0 to 200 psia). The conditions of the distillation zone may be adjusted to control the relative amounts of hydrocarbon contained in the aviation range product stream and the diesel range product stream.

The LPG and naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used in other processes such as a feed to a hydrogen production facility. Similarly, the naphtha may be used in other processes, such as the feed to a hydrogen production facility.

The separated gaseous component comprises mostly hydrogen and in some embodiment may possibly some of the carbon dioxide from hydrogenation and deoxygenation reaction zone. If present, techniques to remove carbon oxides as discussed above. The hydrogen remaining after the removal of the carbon dioxide may be recycled to the reaction zone where hydrogenation primarily occurs and/or to any subsequent beds/reactors.

Depending upon the application, various additives may be combined with the diesel or aviation fuel composition generated in order to meet required specifications for different specific fuels. Therefore, the diesel range product and the aviation range product, while possible to meet the requirement of a fuel, may be used as a component for a fuel. The product may be blended with other components to form a diesel or aviation fuel, or one or more additives may be added to the product in order to form the final diesel or aviation fuel.

For example, the aviation fuel composition generated herein complies with, is a blending component for, or may be combined with one or more additives to meet at least one of: ASTM D 1655 Specification for Aviation Turbine Fuels Defense Stan 91-91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MIL-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification MIL-DTL-83133, which is a military grade type of highly refined kerosene based jet propellant specified by the United States Government. The fuel produced from glycerides and FAAs is very similar to isoparaffinic kerosene or iPK, also known as a synthetic jet fuel.

The specifications for different types of fuels are often expressed through acceptable ranges of chemical and physical requirements of the fuel. As stated above, aviation turbine fuels, a kerosine type fuel including JP-8, are specified by MIL-DTL-83133, JP-4, a blend of gasoline, kerosene and light distillates, is specified by MIL-DTL-5624 and JP-5 a kerosene type fuel with low volatility and high flash point is also specified by MIL-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet the specification is quite common. While the product of the present invention may meet fuel specifications, it is expected that some blending of the product with other blending components may be required to meet the desired set of fuel specifications. In other words, the aviation product of this invention is a composition which may be used with other components to form a fuel meeting at least one of the specifications for aviation fuel such as JP-8. The desired products are highly paraffinic distillate fuel components having a paraffin content of at least 75% by volume.

A portion of the product hydrocarbon, the diesel range product or the aviation range product, or a mixture of both, after the isomerization and selective hydrocracking zone may be recycled to the hydrogenating and deoxygenating reaction zone, or the recycle stream may be taken from the product hydrocarbon stream after the hydrogenating and deoxygenating reactor(s) and separation form gaseous components, and recycled back to the hydrogenating and deoxygenating reaction zone. A portion of a hydrocarbon stream may also be cooled down if necessary and used as cool quench liquid between the beds of the deoxygenation reaction zone to further control the heat of reaction and provide quench liquid for emergencies. The recycle stream may be introduced to the inlet of the deoxygenation reaction zone and/or to any subsequent beds or reactors. One benefit of the hydrocarbon recycle is to control the temperature rise across the individual beds. However, as discussed above, the amount of hydrocarbon recycle herein is determined based upon the desired hydrogen solubility in the reaction zone. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation.

Turning to the FIGURE, one embodiment of the invention is shown. The renewable feedstock 102 enters hydrogenation and deoxygenation reaction zone 104 along with recycle hydrogen 126. Hydrogenation and deoxygenation zone effluent 106 is separated in a separation zone 108. At least carbon oxides and water vapor are removed in line 110 and hydrogen is optionally removed in line 111. Optionally, line 111 can be eliminated and the hydrogen carried in line 110 with the carbon oxides and water vapor. Additional water may optionally be removed in line 109 depending upon the units employed and the operating conditions of separation zone 108. Separated hydrogenated and deoxygenated paraffins are passed via line 112 to isomerization and selective hydrocracking zone 116 along with optional recycle hydrogen 126a and optional make-up hydrogen 114. Isomerization and selective hydrocracking zone effluent 118 is combined with line 110 to form combined stream 119 and passed to product recovery zone 120. Carbon oxide stream 128, light ends stream 130, water byproduct stream 124, hydrogen stream 126, an aviation range product 122, and a diesel range product 121 are removed from product recovery zone 120. Aviation range product 122 may be used as an aviation fuel, or as a blending component for an aviation fuel. Diesel range product 120 may be used as a diesel fuel, or as a blending component for a diesel fuel.

The invention claimed is:

1. A process for producing both a diesel range product and an aviation range product from a renewable feedstock comprising:
   hydrogenating and deoxygenating the renewable feedstock by contacting the renewable feedstock and hydrogen with a hydrogenation and deoxygenation catalyst in a hydrogenation and deoxygenation zone at hydrogenating and deoxygenating conditions to provide a hydrogenation and deoxygenation zone effluent comprising paraffins, hydrogen, water, and carbon oxides;
   separating at least the paraffins from the hydrogenation and deoxygenation zone effluent;
   isomerizing and selectively hydrocracking the separated paraffins by contacting the separated paraffins, in the presence of hydrogen, with an isomerization and selective hydrocracking catalyst in an isomerization and selective hydrocracking zone at isomerization and selective hydrocracking conditions and generating an isomerization and selective cracking zone effluent comprising at least normal and branched paraffins in the diesel boiling point range, normal and branched paraffins in the aviation boiling point range, hydrogen, naphtha, and LPG;
   separating the isomerization and selective hydrocracking zone effluent into a gaseous component and a liquid component wherein the liquid component comprises the normal and branched paraffins in the diesel boiling point range, normal and branched paraffins in the aviation boiling point range, naphtha, and LPG; and
   separating, in a fractionation zone, the liquid component into at least a diesel boiling range product and an aviation boiling range product.

2. The process of claim 1 further comprising pre-treating the renewable feedstock in a pretreatment zone at pretreatment conditions to remove at least a portion of contaminants in the feedstock.

3. The process of claim 1 where the hydrogenation and deoxygenation conditions include a temperature of about 200° C. to about 400° C. and a pressure of about 1379 kPa absolute (200 psia) to about 6895 kPa absolute (1000 psia).

4. The process of claim 1 where the isomerization and selective cracking conditions include a temperature of about 150° C. to about 360° C. and a pressure of about 1724 kPa absolute (250 psia) to about 4826 kPa absolute (700 psia).

5. The process of claim 1 wherein the renewable feedstock is in a mixture or co-feed with a petroleum hydrocarbon feedstock.

6. The process of claim 1 wherein the renewable feedstock comprises at least one component selected from the group consisting of canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, cottonseed oil, inedible tallow, yellow and brown greases, lard, train oil, fats in milk, fish oil, algal oil, sewage sludge, pyrolysis oil, liquids derived from the gasification of coal, liquids derived from depolymerization, synthetic oils, and mixtures thereof.

7. The process of claim 1 further comprising separating in the fraction zone a LPG and naphtha stream.

8. The process of claim 7 further comprising separating in a second fractionation zone, the LPG and naphtha stream into an LPG stream and a naphtha stream.

9. The process of claim 8 further comprising recycling at least a portion of the naphtha stream to the isomerization and selective hydrocracking zone.

10. The process of claim 1 wherein the hydrogenation and deoxygenating zone conditions and the isomerization and selective hydrocracking zone conditions include temperatures from about 40° C. to about 400° C. and pressures from about 689 kPa absolute (100 psia) to about 13,790 kPa absolute (200 psia).

11. The process of claim 1 further comprising recycling at least a portion of the separated paraffins to the hydrogenation and deoxygenation zone.

12. The process of claim 1 wherein the isomerization and selective hydrocracking zone is operated at a pressure at least about 345 kPa absolute (50 psia) greater than that of the hydrogenation and deoxygenation zone.

13. A diesel boiling range product and an aviation boiling range product as produced by the process of claim 1.

14. The process of claim 1 further comprising mixing one or more additives to the diesel boiling range product, the aviation boiling range product, or both.

15. A fuel meeting the specification of MTL-DTL-83133 wherein at least one component of the fuel is the aviation boiling range product produced by the process of claim 1.

16. A blended fuel comprising the diesel boiling range product of claim 1 and a component produced from processing a petroleum feedstock.

17. A blended fuel comprising the aviation boiling range product of claim 1 and a component produced from processing a petroleum feedstock.

* * * * *